United States Patent [19]

Robinson et al.

[11] Patent Number: 4,744,929

[45] Date of Patent: May 17, 1988

[54] SUPPORT DEVICE FOR A PACKED COLUMN

[75] Inventors: Kenneth Robinson, Gnosall, England; Frank Rukovena, Jr., Tallmadge, Ohio

[73] Assignee: Norton Company, Worcester, Mass.

[21] Appl. No.: 23,413

[22] Filed: Mar. 9, 1987

[30] Foreign Application Priority Data

Aug. 22, 1986 [EP] European Pat. Off. .......... 8630550.4

[51] Int. Cl.$^4$ .............................................. B01F 3/04
[52] U.S. Cl. ....................................... 261/97; 55/233; 202/158; 261/94; 261/113; 261/114.1
[58] Field of Search ...................... 261/94, 95, 97, 113, 261/114.1, DIG. 72; 52/246, 635, 670–672; 202/158; 210/150; 55/90, 233

[56] References Cited

U.S. PATENT DOCUMENTS

| | | | |
|---|---|---|---|
| 2,182,533 | 12/1939 | Bowman | 261/114.1 X |
| 2,686,046 | 8/1954 | Green et al. | 261/114.1 |
| 3,016,234 | 1/1962 | Huppmeier | 261/98 |
| 3,222,040 | 12/1965 | Eckert | 261/94 |
| 3,222,041 | 12/1965 | Eckert | 261/94 |
| 3,273,872 | 9/1966 | Eckert | 261/97 X |
| 3,360,246 | 12/1967 | Eckert | 261/97 X |
| 3,937,769 | 2/1976 | Strigle, Jr. et al. | 261/97 |
| 3,969,447 | 7/1976 | Glitsch et al. | 261/111 |
| 4,087,252 | 5/1978 | Strahorn et al. | 261/97 X |
| 4,171,333 | 10/1979 | Moore | 261/94 |
| 4,264,538 | 4/1981 | Moore et al. | 261/97 |

FOREIGN PATENT DOCUMENTS 1097992 1/1968 United Kingdom ................. 261/97

Primary Examiner—Richard L. Chiesa
Attorney, Agent, or Firm—Frank S. Chow

[57] ABSTRACT

A support device for supporting a packing material in a packed column having an upwardly flowing gas and a downwardly flowing liquid. The device comprises a plate having a plurality of formations. Each formation comprises spaced side walls connected by an upper wall, with apertures being provided in the side walls to permit the flow of the gas therethrough. A collecting channel is provided on at least one of the formations to collect the downwardly flowing liquid. The formations have a plural-skin construction to reduce the amount of liquid flowing through the apertures. The formations are provided with streamlining in order to improve the efficiency of gas flow.

12 Claims, 6 Drawing Sheets

SUPPORT DEVICE FOR A PACKED COLUMN

BACKGROUND OF THE INVENTION

1. Field of the Invention

This invention relates to a support device for a packed column. More particularly the invention relates to a support device for supporting a packing material in a packed column having counterflowing gas and liquid.

2. Description of the Prior Art

Packed columns are typically used for gas absorption and for distillation. The column contains a packing material through which the liquid usually flows downwardly and the gas usually flows upwardly. The packing material may, for example, comprise Raschig rings or Pall rings.

It is often desirable to take a sidestream from the packed column, and to do so presents particular problems. In particular it is necessary to provide a support device for the packing material beneath which is situated a collection tray.

The support device permits liquid to pass downwardly therethrough to be collected by the collection tray from where it can be directed to a side of the column. A proportion of the liquid is taken from the column as a sidestream, and the remainder, if any, is fed back to the column either above or below the collection tray.

The sidestream may be fed to another part of the chemical plant, or it may be recycled to the column at a position either above or below the collection tray.

It is clear from the foregoing that two separate items (i.e. a collection tray and a support device) are needed when a sidestream is taken from a column. Furthermore, a spacing of 1 or 2 meters may be necessary between the support device and the collection tray. Thus, the provision of a sidestream in a column significantly increases capital costs. In addition, maintenance is time consuming because two separate items must be maintained.

SUMMARY OF THE INVENTION

It is an object of the present invention to provide an improved support device for a packed column.

According to a first aspect of the present invention there is provided a support device for supporting a packing material in a packed column having a counterflowing gas and liquid, said device comprising a plate having a plurality of formations adapted to permit the flow of gas therethrough, and collecting means provided on at least one of the formations, said collecting means being adapted to collect liquid.

This enables the support device to function as both a support device for the packing material and as a collector for downcoming liquid. The collecting means serves to reduce the amount of liquid which can flow through the support device.

Preferably the collecting means is provided on at least two of the formations, more preferably on each of the formations.

Advantageously the collecting means is arranged to direct the collected liquid to an edge of the plate. To this end the collecting means may comprise a channel provided in the formations and the channel may extend from the formations to an edge of the plate. A liquid sump can be provided at the edge of the plate. The collected liquid may then be taken from the column as a sidestream.

The formations may be adapted to permit the flow of gas therethrough by the provision of apertures therein.

Advantageously the collecting means is arranged above the apertures so that, in use, the collecting means collects the liquid before it can run through the apertures. This arrangement enables the amount of liquid which flows through the support device to be reduced substantially.

In one embodiment each formation may comprise a single-skin construction.

In another embodiment each formation may comprise a plural-skin construction, advantageously a double-skin construction. To this end a plurality of cover members may be provided, each cover member being disposed over a respective one of the formations. Each cover member may be adapted to permit the flow of gas therethrough by the provision of a plurality of apertures therein.

The cover members help to reduce further the amount of liquid which can flow through the support device.

Desirably the formations and the cover members each comprise spaced side walls connected by an upper wall; the upper wall may extend substantially transverse to the side walls and substantially parallel to the plane of the plate.

Preferably the collecting means is provided on the upper wall of the formations. In the double-skin embodiment the collecting means can be provided on the upper wall of the cover members.

The collecting means may comprise a channel formed in the upper wall of the formations. In the double-skin embodiment the channel may be formed in the upper wall of the cover members.

Alternatively the side walls of the formations may extend above the upper wall to define the collecting means between the side walls above the upper wall. In the double-skin embodiment the side walls of the cover members may extend above the upper wall.

The side walls of the formations may be arranged substantially parallel to one another. In use, the side walls can be disposed substantially vertically.

However, the side walls of the formations may be arranged such that the distance between the side walls increases or decreases with increasing distance from the upper wall; it is preferred that this distance decreases because it helps to reduce the amount of liquid which can flow through the support device.

Preferably, the angle of divergence of the side walls is less than 15°, more preferably less than 10°.

If desired the formations can be streamlined in order to improve the efficiency of gas flow therethrough by reducing the pressure drop through the formations. This is especially useful when the double-skin construction is provided.

A first streamlining formation may be provided on the underside of the upper wall. A second streamlining formation may be provided on the underside of the plate between adjacent formations.

The first streamlining formations are preferably integral with the plate formations, and the second streamlining formations are preferably integral with the plate formations or the plate. This construction requires less material, has greater structural strength and is easier to manufacture.

The first and/or second streamlining formations may have a circular or triangular configuration, for example.

Preferably the formations extend across the plate and are substantially parallel to one another.

According to a second aspect of the invention there is provided a support device for supporting a packing material in a packed column having a counterflowing gas and liquid, said device comprising a plate having a plurality of formations, each formation comprising spaced side walls connected by an upper wall, and apertures provided in the side walls to permit the flow of the gas therethrough, and a channel adapted to collect liquid provided on the upper wall of at least one formation.

Preferably the plate comprises a base from which the formations extend upwardly, and further channels for collecting liquid are disposed above the base between adjacent formations.

The support device according to the second aspect of the invention may be provided with one or more of the features of the support device according to the first aspect of the invention.

According to a third aspect of the invention there is provided a support device for supporting a packing material in a packed column having a counterflowing gas and liquid, said device comprising a plate having a plurality of formations adapted to permit the flow of said gas therethrough, wherein each formation comprises a double-skin construction.

Advantageously collecting means is provided on at least one of the formations, said collecting means being adapted to collect liquid.

The support device according to the third aspect of the invention may be provided with one or more of the features of the support device according to the first or second aspects of the invention.

According to a fourth aspect of the invention there is provided a support device for supporting a packing material in a packed column having a counterflowing gas and liquid, said device comprising a plate having a plurality of formations adapted to permit the flow of said gas therethrough, wherein the formations are streamlined to improve the efficiency of gas flow therethrough.

The support device according to the fourth aspect of the invention may be provided with one or more of the features of the support device according to the first, second or third aspects of the invention.

BRIEF DESCRIPTION OF THE DRAWINGS

Reference is now made to the accompanying drawings, in which.

DESCRIPTION OF THE PREFERRED EMBODIMENTS

Figure 1:
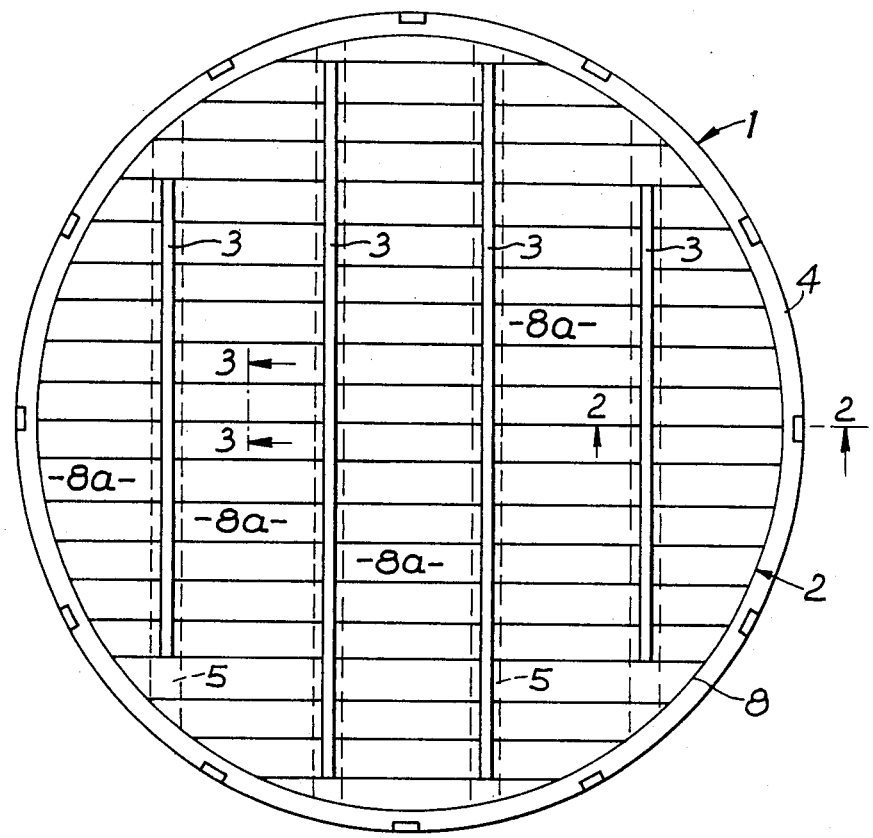
FIG. 1 is a diagrammatic plan view of a first embodiment of a support device in a packed column, according to the invention.

In FIGS. 1 to 4 a packed column generally designated 1 is provided with a support device 2; a packing material not shown is supported in the column 1 on top of the support device 2.

The support device 2 includes a plurality of beams 3 extending across the column 1, which serve to reinforce structurally the support device 2, and enable the support device 2 to be secured to the column 1.

The support device 2 also includes a circumferential sump 4 provided around the periphery thereof, and a plurality of parallel sumps 5 extending across the support device 2. The sumps 5 substantially parallel to the beams 3, and each sump 5 is located in the region of a respective one of the beams 3.

Downpipes 6 (of which only one is shown) are secured to the sump 4, and downpipes 7 (of which only one is shown) are secured to the sumps 5. Liquid can be taken from the column 1 from the downpipes 6 and 7.

The support device 2 comprises a plate 8 having a plurality of formations 9 provided thereon; the plate 8 and formations 9 provide a corrugated configuration. The plate 8 is formed from a plurality of elongate members 8a one of which is shown in cross-section in FIG. 3. The members 8a are juxtaposed and may be secured together by welding. It will be appreciated that the members 8a could be manufactured in one piece.

The formations 9 comprise spaced side walls 10 connected by an upper wall 11. A plurality of apertures 12 are provided in the side walls 10 to permit the flow of gas therethrough.

A double-skin construction is provided by the formations 9 which further include cover members 13; each cover member 13 comprises spaced side walls 14 which are connected by an upper wall 15. The side walls 14 extend above the upper wall 15 to define a channel 16 therebetween; the channel 16 acts as collecting means to collect liquid flowing downwardly through the column. The side walls 14 of each cover member 13 are provided with apertures 17 to permit the flow of gas therethrough. The apertures 17 are disposed out of alignment with the apertures 13 in order to reduce further the flow of liquid therethrough.

The channels 16 extend along the top of the formations 9 and deliver the liquid collected either to the circumferential sump 4 or to one of the sumps 5. The upper wall 15 of each cover member 13 is provided with apertures 15a at opposite ends thereof. The apertures 15a are disposed either above one of the sumps 5 or above the sump 4, so that liquid can drain into the sump from the channel 16.

Thus, the channels 16 reduce substantially the amount of liquid which flows through the apertures 12 and 17. If the channels 16 were not provided then liquid falling on the upper wall 15 would run down the side walls 14 and a portion of this liquid may flow through the apertures 12 and 17.

The plate 8 is provided with a base 18 and the formations 9 extend upwardly from the base 18. The base is non-perforated, so that neither liquid nor gas can flow therethrough. The base 18, together with adjacent formations 9, define a channel 19 therebetween. The channel 19 collects liquid not collected by the channel 16 and delivers this liquid either to the circumferential sump 4 or to one of the sumps 5.

Figure 2:
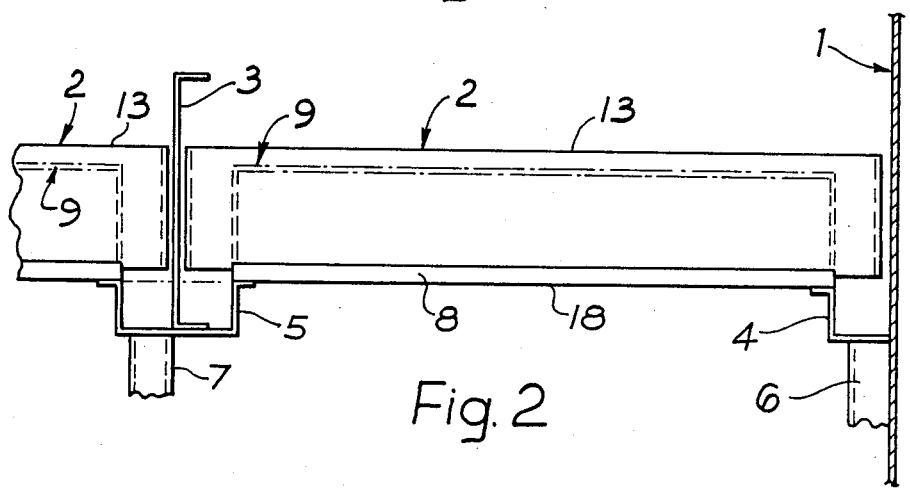
FIG. 2 is a section on lines 2—2 of FIG. 1.
Figure 3:
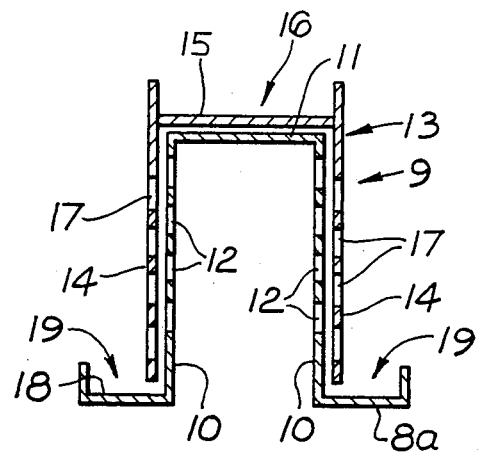
FIG. 3 is a section on lines 3—3 of FIG. 1.
Figure 4:
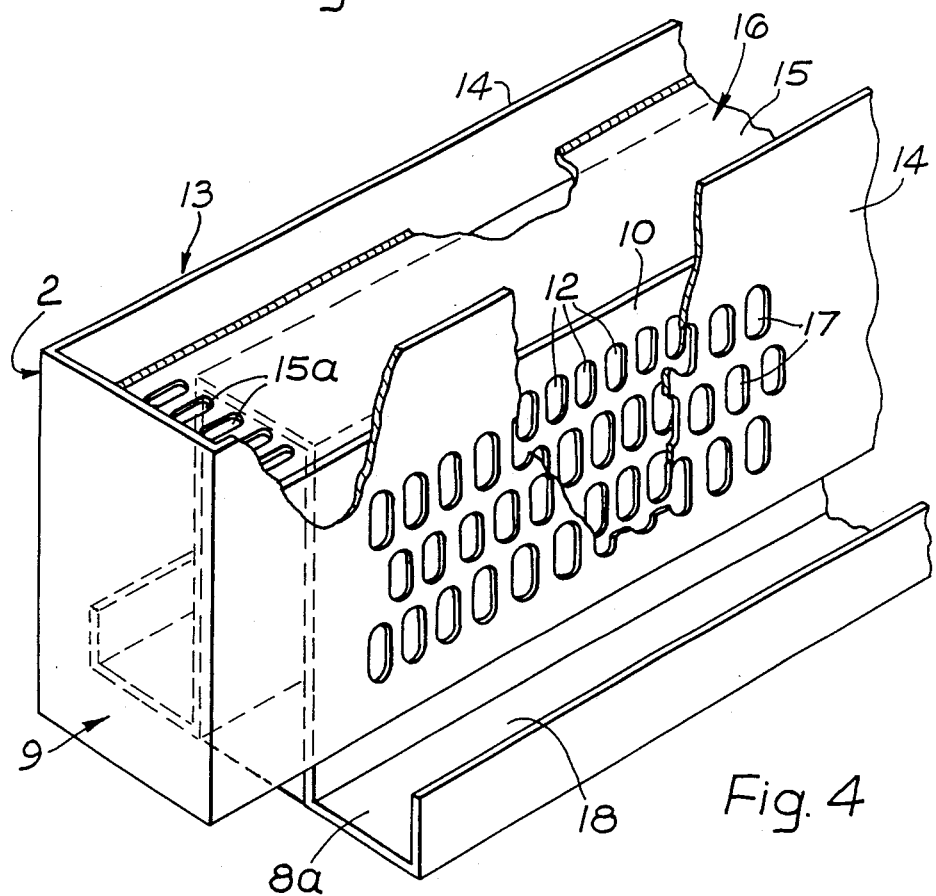
FIG. 4 is a perspective view of the support device shown in FIGS. 1 to 3 with part broken away.
Figure 5:
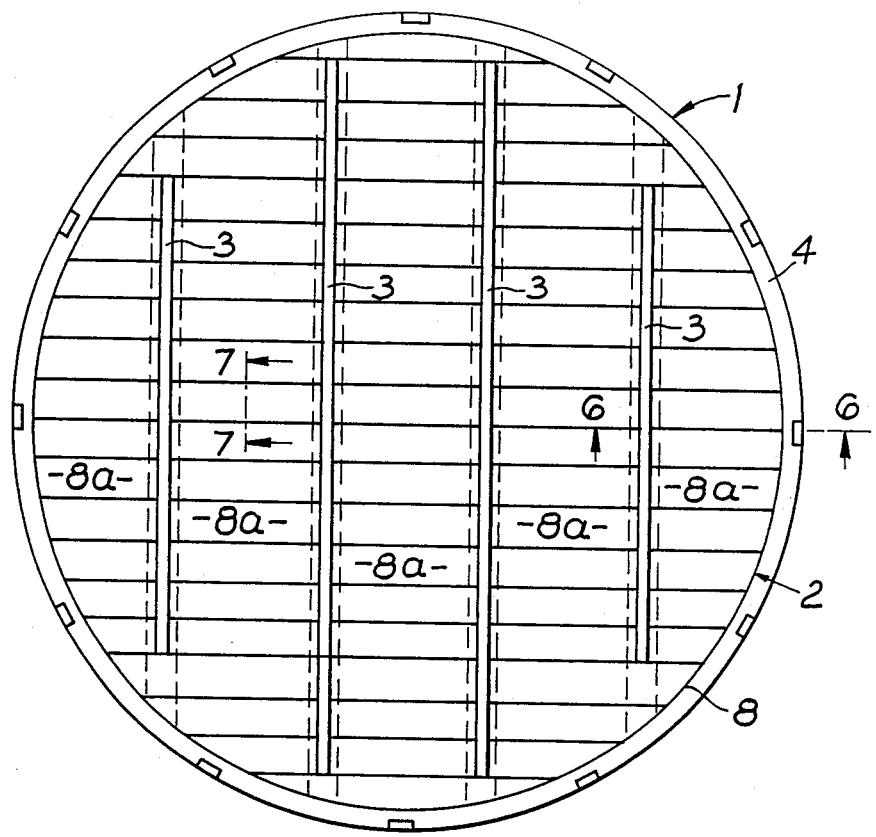
FIG. 5 is a diagrammatic plan view of a second embodiment of a support device in a packed column, acocrding to the invention.
Figure 6:
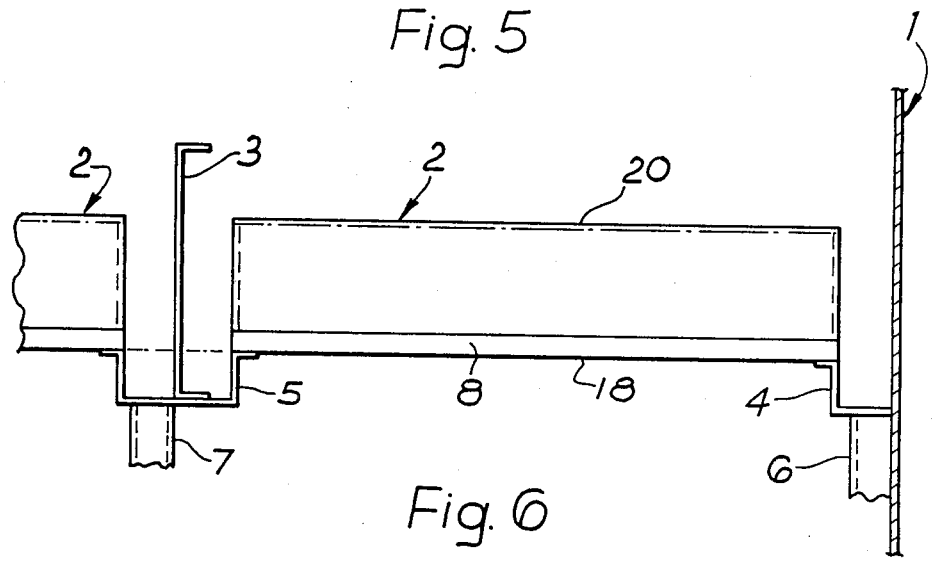
FIG. 6 is a section on lines 6—6 of FIG. 5.
Figure 7:
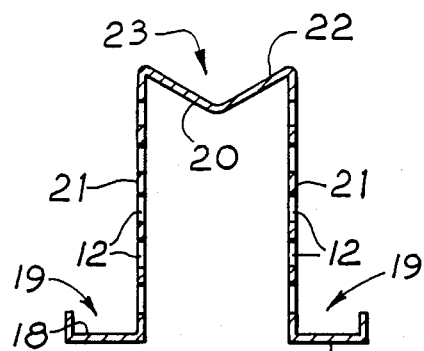
FIG. 7 is a section on lines 7—7 of FIG. 5.

Another embodiment is shown in FIGS. 5 to 7; many of the parts in FIGS. 5 to 7 are similar to those shown in FIGS. 1 to 3 and like parts are designated with like reference numerals.

The principal difference is that the embodiment shown in FIGS. 5 to 7 is provided with a single-skin construction. Formations 20 are each provided with spaced side walls 21 and an upper wall 22 having a channel 23 therein. The channel 23 serves as collecting means and performs a similar function to the channel 16 in the embodiment shown in FIGS. 1 to 3.

Figure 8:
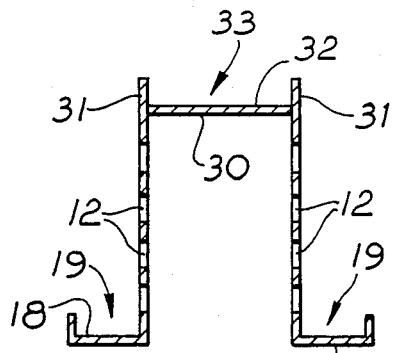
FIG. 8 is a modification of the embodiment shown in FIG. 7.

FIG. 8 shows a modification of the formations 20 shown in FIG. 6. The formations 20 are replaced with formations 30 which comprise spaced side walls 31 and an upper wall 32. The side walls 31 extend above the upper wall 32 and define a channel 33 therebetween. The channel 33 serves as collecting means and performs a similar function to the channels 16 and 23.

Figure 9:
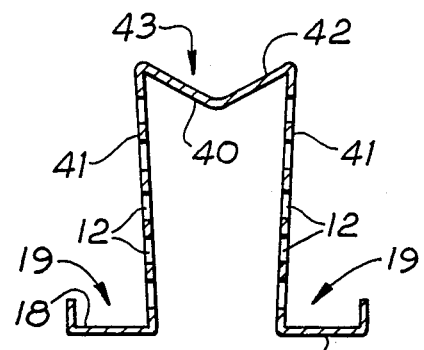
FIG. 9 is a modification of the embodiment shown in FIG. 7.

FIG. 9 shows a further modification of the formations 20 shown in FIG. 7. The formations 20 are replaced with formations 40 which comprise divergent spaced side walls 41 and an upper wall 42 having a channel 43 therein. The channel 43 serves as collecting means and performs a similar function to the channels 16, 23 and 33.

The distance between the side walls 41 decreases with increasing distance from the upper wall 42. This divergence helps to prevent liquid from flowing through the apertures 12.

Figure 10:
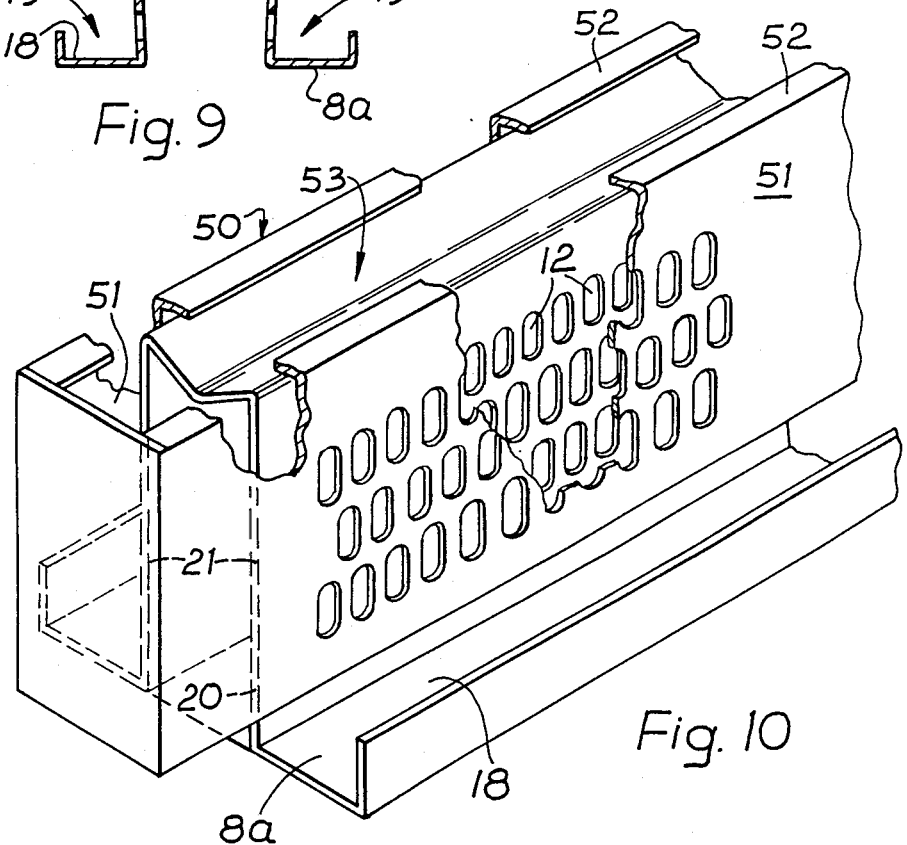
FIG. 10 is a perspective view of a modification of the support device shown in FIGS. 1 to 4.

In FIG. 10 a further embodiment of support device 1 is shown. The formations 20 in the embodiment of FIG. 9 are the same as the formations 20 shown in FIG. 6, except that they include cover members 50 which comprise spaced side walls 51 and an upper wall 52. A gap 53 is provided in the upper wall 52 through which liquid can flow to the channel 23.

Figure 11:
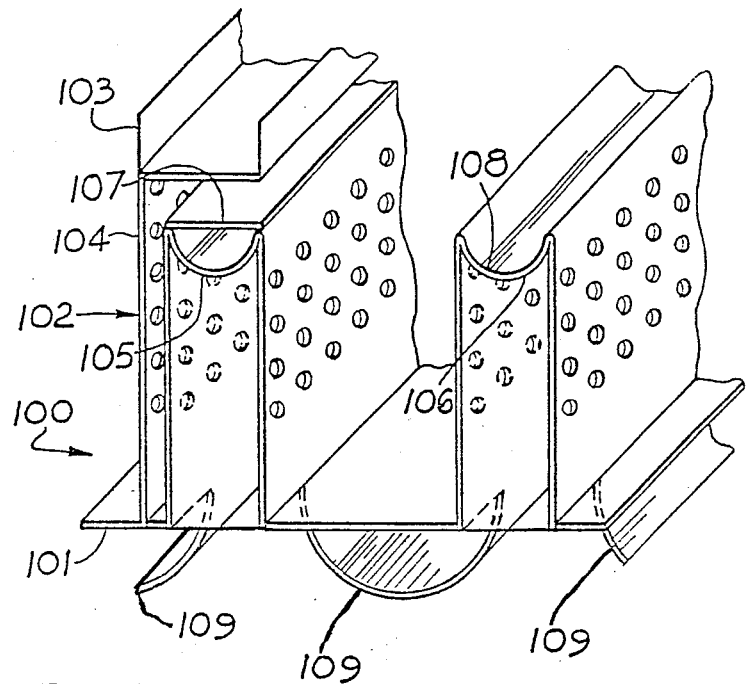
FIG. 11 is a perspective view of a further embodiment of support device according to the invention.

In FIG. 11 a further embodiment of support device is designated 100. The support device 100 comprises a plate 101 with formations 102 and a collecting channel 103; the formations 102 comprise a double-skin construction and include cover members 104.

It is not essential to use a double-skin construction in this embodiment. As shown, the right hand formation 102 is provided with a single-skin construction.

First streamlining formations 105 and 106 are provided beneath upper walls 107 and 108 respectively of the formations 102. The steamlining formations 105 and 106 are respectively integral and non-integral with the formations 102, and are circular in shape. The streamlining formations need not necessarily be circular. Other streamlined shapes, such as paraboloid, triangular, shape or elliptical, can also be used.

Second streamlining formations 109 are provided beneath the plate 101 between adjacent formations 102. The second streamlining formations 109 are integral with the formations 102.

Figure 12:
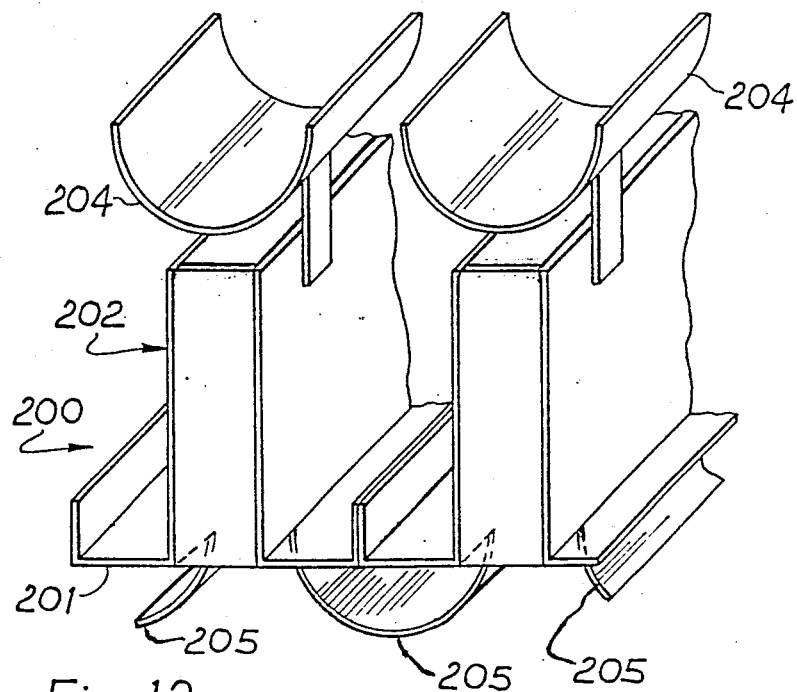
FIG. 12 is a perspective view of the chimney tray provided with streamlining according to the invention.

FIG. 12 shows a chimney tray 200 comprising a plate 201 and formations 202. The formations 202 are provided with streamlining formations 204 and 205 to improve the gas flow.

Figure 13:
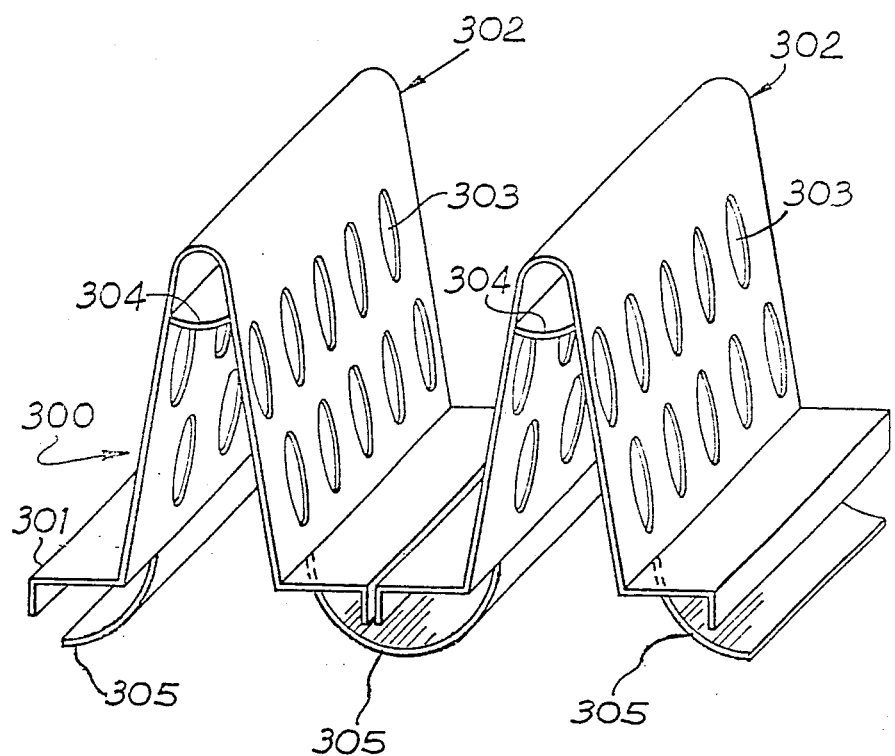
FIG. 13 is a perspective view of a packing support plate provided with streamlining according to the invention.

FIG. 13 shows a packing support plate 300 comprising a plate 301 and formations 302. The formations 302 are provided with gas flow apertures 303. Streamlining formations 304 and 305 are provided to improve the gas flow.

We claim:

1. A support device for supporting a packing material and collecting a portion of liquid flow in a packed column of a counterflowing gas and liquid contact apparatus comprising:

support means including a circumferential sump extending about and at least one other sump extending across the support device supported within and by the column;

a plate having a plurality of juxtaposed elongate members and upwardly extending formations thereon extending between the sumps and each formation comprising at least one spaced pair of side walls extending upwardly from the elongate members of the plate and adapted to permit the flow of said gas into and through the formations; and liquid collecting means provided on top of at least one of the formations and situated adjacent the said side walls for collecting and directing a portion of the liquid to an edge of the plate and into one of said sumps adjacent the edge.

2. A support device according to claim 1 in which the collecting means further comprises:

a channel in the elongate member of the plate arranged to direct the collected liquid to an edge of the plate and into one of said sumps.

3. A support device according to claim 1 in which the collector means comprises:

a channel connected to a sidewall and arranged to direct liquid to an edge of the plate and into one of said sumps.

4. A support device according to claim 1 in which each formation has collecting means thereon.

5. A support device according to claim 1, in which the formations are streamlined to improve the efficiency of gas flow therethrough.

6. A support device according to claim 5 in which each formation streamlined comprises spaced perforated side walls with perforations connected by an upper wall, and a first streamlining formation provided on the underside of the upper wall.

7. A support device according to claim 6, in which a second streamlining formation is provided on the underside of the plate between adjacent formations.

8. A support device according to claim 1 wherein each formation has a plural-skin construction comprising:

a first spaced pair of perforated side walls with perforations extending upwardly from the elongate members of the plate and connected by a first upper wall;

a cover member disposed on each of the formations including a second spaced pair of upwardly extending perforated side walls with perforations connected to a second upper wall and situated adjacent the first spaced pair of perforated side walls and the first upper wall and wherein the liquid collecting means is provided on at least one of the formations and situated adjacent the second upper wall and above the perforations in the side walls whereby the formations are adapted to permit the flow of said gas and to reduce the flow of liquid through the perforations in the side walls and the support device.

9. A support device according to claim 8, in which the collecting means comprises:
   a channel connected to and situated between the second spaced pair of side walls.

10. A support device according to claim 9, in which the collecting means further comprises channels in the elongate members of the plate between adjacent formations.

11. A support device according to claim 8, in which each formation further comprises a first streamlining formation provided on the underside of the first upper wall.

12. A support device according to claim 11, in which a second streamlining formation is provided on the underside of the plate between adjacent formations.

* * * * *